United States Patent [19]

Hagiwara et al.

[11] 4,056,637

[45] Nov. 1, 1977

[54] PROCESS FOR PREPARING FOOD PRODUCTS CONTAINING A LACTIC ACID BACTERIA-FERMENTED PRODUCT OF A CEREAL GERM

[75] Inventors: Yoshihide Hagiwara, Takarazuka; Miyauchi Tetsuji, Itami; Yuki Morimasa, Kawanishi, all of Japan

[73] Assignee: Japan Natural Food Co. Ltd., Osaka, Japan

[21] Appl. No.: 693,761

[22] Filed: June 8, 1976

[51] Int. Cl.² .................... A23L 1/172; A23L 1/28
[52] U.S. Cl. .................................. 426/52; 426/655
[58] Field of Search ............... 426/7, 18, 31, 51, 52, 426/44, 46, 48, 436

[56] References Cited

U.S. PATENT DOCUMENTS 1,028,508   6/1912   Wahl ............................ 426/44 X
1,896,520   2/1933   Komm ............................ 426/44

Primary Examiner—Raymond N. Jones
Assistant Examiner—R. A. Yoncoskie
Attorney, Agent, or Firm—Sherman & Shalloway

[57] ABSTRACT

A lactic acid bacteria-fermented food product of a cereal germ is prepared, which comprises inoculating with lactic acid bacteria a culture medium containing a water extract of a cereal germ as a main ingredient, and then cultivating the lactic acid bacteria therein to a sufficient level to produce the lactic-acid bacteria-fermented food product.

12 Claims, No Drawings

PROCESS FOR PREPARING FOOD PRODUCTS CONTAINING A LACTIC ACID BACTERIA-FERMENTED PRODUCT OF A CEREAL GERM

This invention relates to a process for preparing food products comprising a lactic acid bacteria-fermented product of the useful ingredients of a cereal germ in high concentrations which are free from the poor palatability of cereal germs ascribable to bad smell, taste and susceptibility to spoilage.

The health-promoting and nutritional values of lactic acid bacteria-fermented products of milks, that is, coagulated milks, have been recognized for many years, and a number of suggestions have been made as to their production. Attempts have also been made to produce such coagulated milks by utilizing cereal germs or extracts thereof. These prior techniques include, for example, a method of producing coagulated milk by adding a very samll amount of a germ-leached product in an attempt to avoid the inhibition of the growth of lactic acid bacteria caused by the deviation of the pH from the optimal range as a result of the formation of lactic acid (Japanese Pat. Pub. No. 4156/1930); a method for obtaining a coagulated milk product by mixing a naturally fermented product of a mixture consisting of a rice germ powder, a rice koji powder and a low-fat milk, with a separately prepared coagulated milk (Japanese Pat. Pub. No. 5213/1932); and a method of cultivating lactic acid bacteria in milk to which a tiny amount of a rice bran-leached product has been added (Japanese Pat. Pub. No. 2647/65).

The prior suggestions however fail to disclose any technical concept and means of producing lactic acid bacteria-fermented products of the useful components of cereal germs that have a very high nutritional value themselves.

It is well known that cereal germs contain good quality proteins, essential fatty acids not synthesizable within the human body, such as linoleic acid, nicotinic acid and pantothenic acid, various vitamins such as vitamin $B_1$, $B_2$, $B_6$, E, F, and H, (Biotin) and minerals such as K, Na, Ca and Mg. Thus, the cereal germs are known to be "natural food products" which contain a well-balanced combination of nutrients that tend to be deficient in foods and drinks normally taken by humans, and which exhibit superior actions of, for example, improving the physical constitution, helping longevity, nourishing the skin, promoting health, and curing certain diseases.

In spite of this, there has been suggested no idea of providing a lactic acid bacteria-fermented food product of cereal germs themselves or the useful ingredients extracted therefrom. This is probably because the extraction of the useful ingredients of germs is an extremely difficult operation and the efficiency of extraction is poor, and their inherent poor edibility and potability and their susceptibility to spoilage have mitigated against incentives to attempt to produce feasible fermented products of cereal germs for human consumption. In fact, in the prior suggestions cited above, the underlying technical concept was merely to utilize a tiny amount of extracted ingredients of germs for promoting the lactic acid bacteria-fermentation of milk components to produce coagulated milk.

Our extensive investigations in an attempt to provide lactic acid bacteria-fermented products of the extracted ingredients of cereal germs themselves have led to the discovery that a food product which is the lactic acid bacteria-fermented product of a cereal germ which has superior edibility and potability can be obtained by inoculating a culture medium with lactic acid bacteria wherein the main ingredient of the culture medium is a water extract of a cereal germ, and cultivating the bacteria until the desired level of the fermented product is obtained. We have also found that a better quality lactic acid bacteria-fermented food product of a cereal germ can be obtained by inoculating with lactic acid bacteria a culture medium composed of, as a main ingredient, a water extract of a cereal germ which is obtained by hot water extraction of the cereal germ in the presence of a starch hydrolase (the extraction method previously suggested by our copending Japanese Pat. No. 36375/73), and cultivating the bacteria therein.

Japanese Pat. No. 26474/65 cited above states that the promotion of the growth of lactic acid bacteria by the method disclosed therein is due to the suitable concentration of milk or a low-fat powdery milk, and the suitable amount and temperature of the leached product of defatted rice bran added thereto, and also to the synergistic effect of bases, vitamins, and traces of metals present in the leached product; and teaches a method of cultivating lactic acid bacteria wherein the addition of 0.4 to 0.6% of the leached product to a 20 to 22% milk solution is essential. In contrast, we have found that by fermenting the extracted ingredients of a cereal germ or the germ itself in the presence of lactic acid bacteria using a culture medium containing the extract of the germ or the germ itself and without requiring the presence of milk, an excellent increase of bacterial population can be achieved, and contrary to the expected unsuitability of cereal germs for human consumption, the process of this invention can afford a lactic acid bacteria-fermented cereal germ food product having superior edibility and potability.

Accordingly, it is an object of this invention to provide a process for preparing with commercial advantage a lactic acid bacteria-fermented food product of the useful components of a cereal germ or the germ itself which have superior edibility and potability and exhibit superior actions of, for example, improving the physical constitution, helping longevity, nourishing the skin, promoting health, and curing certain diseases, the process comprising cultivating lactic acid bacteria in a culture medium containing the germ itself or germ extract as a main ingredient.

Many other objects and advantages of the present invention will become apparent from the following description.

The culture medium used in the process of this invention consists mainly of a water extract of a cereal germ. The content of the extract in the culture medium is usually at least about 25% by volume, preferably at least about 35% by volume, more preferably at least about 50% by volume, based on the volume of the culture medium. Preferably, the extract has a solid content of at least about 2%, more preferably at least about 5%, especially preferably at least about 10%, based on its own weight.

The extraction of cereal germs is carried out with hot water preferably at a temperature of at least 60° C. and up to the boiling point of the extraction system. The amount of water as an extractant and the extracting temperature can be varied suitably according, for example, to the type, form or grain size of the germ. For example, in the case of a wheat germ powder, an aqueous slurry prepared by adding about 10 liters of water to about 1 Kg of the powder is heated at about 90° C. for about 30 minutes, lightly boiled for about 2 to 3 minutes, and then subjected to a liquid-solid separating means using, for example, a filter cloth to afford an extract with a solids content of about 3.5 to 4%. If the extracting temperature is too low, the concentration of the extracted components decreases, and too high extracting temperatures make the extracting and separating procedures difficult. Hence, it is desirable to choose moderate extracting temperatures. The extracting operation may be performed in a single or a multiplicity of stages, and there is no particular restriction in this regard.

The germs of cereals, such as rice and wheat, can be utilized either as such or after being defatted. The extracting water, if desired, may contain a sucrose fatty acid ester, a sorbitan fatty acid ester, or an emulsifying agent or surface active agent whose intake into the body is permissible. The form of the starting germ is neither restricted, and may be a powder, coarsely pulverized product, or flattened product.

The concentration of the extracted components can be increased by extracting the germ with hot water in the presence of a starch hydrolase. The starch hydrolase is well known, and commercially available. Examples of such enzymes are α-amylase, malt amylase, diastase, Takadiastase, and gluco-amylase. Furthermore, in the process of this invention, the starch hydrolase may be used in conjunction with cellulases or proteases. The use of amylases together with proteases is preferred because it will result in the increased contents of vitamins B or nicotinic acid in the fermented product of this invention, and improve the stability of the proteinaceous components of the final product (by inhibiting the separation of the proteinaceous components).

The amount of the starch hydrolase differs according to the action, properties and enzymatic unit of the exzyme agent used, and also the properties and quality of the starting cereal germ. In many cases, amounts of about 0.1 to 5.0% by weight based on the starting germ are sufficient. For example, in the case of powdery enzyme preparation of 5000 units/g, its amount may be about 0.2 to 0.5% by weight.

The details of the hot water extraction in the presence of a starch hydrolase are described in Japanese Pat. No. 36375/73 cited hereinabove, and are omitted in this application.

As stated hereinabove, the extracting temperature is preferably from about 60° C. to the boiling point of the extraction system. The extracting temperature may be changed stepwise during the extraction operation, or maintained substantially constant during the entire extracting period. When a protease-containing amylase is used, the extraction is preferably initially carried out at room temperature to about 45° C., and then at the above-specified temperature.

The amount of the extracting water is not restricted in particular, and for example, it is at least 2 parts by weight, for example, 2 to 10 parts by weight, per part by weight of the starting cereal germ.

The type of the extracting tank or the method of heating an be freely changed, and any type of the tank and heating method which make hot-water extraction possible can be employed.

If desired, the extraction can be carried out at elevated pressures. Prior to extraction, the starting cereal germ may, if desired, be washed with water, or pasteurized with a suitable disinfectant such as hypochlorous acid. If further desired, the starting germ slurry or suspension may be blanched at a desired stage, for example, during its transfer or extraction. Stirring may be employed in the extracting operaftion, and the heating may be carried out by steaming. Or the starting cereal germ may be packed in a column, and the extractant passed through the column to extract the useful components of the germ. The extraction operation can be performed either continuously or batchwise.

The extracting time is not restricted, and can be varied suitably according, for example, to the method of extraction and the extracting conditions. Usually, a period of about ½ to about 3 hours is sufficient.

After the extraction, the liquid is separated from the solid, and the extract is collected. Any conventional liquid-solid separating procedures can be used for the separation. If desired, the liquid-solid separation and filtration can be facilitated by using an organic or inorganic precipitating agent. In the separating procedure, filtration aids or precipitants, such as diatomaceous earth, terra abla or poly(sodium acrylate) can be utilized. The resulting water extract can be used either directly or after being concentrated by known concentrating means which do not substantially cause thermal changes to the product. Or it may be powdered by known drying means which do not substantially cause thermal changes to the product, and re-dissolved to the desired concentration. The powderization can be carried out by concentration or drying at reduced pressure and low temperatures, preferably by spray-drying at room temperature or under heat, or lyophilization.

A culture medium containing the resulting water-extract of cereal germ as a main ingredient is used in the process of this invention. If desired, the culture medium may further contain minor amounts of culture medium components and/or potable and edible components. The amounts of these secondary components should not be such that will decrease the amounts of the useful components of the water-extract of the cereal germ to very small ones as is the case with the conventional production of coagulated milk. Examples of these additives include animal proteins such as milks, concentrated milks, low- fat milks, or whey; vegetable protein-containing materials such as soybean milk, juices of cereal leaves, or dried products of the cereal leaf juices; carbohydrates such as starch and sugars; egg shells; and yeast extracts, edible plant extracts, malt extract, and fruit juices.

In the process of this invention, the culture medium described above is inoculated with the lactic acid bacteria, and the bacteria are then cultivated. The culture medium is heat-sterilized in a customary manner, and a starter resulting from the cultivation of lactic acid bacteria, for example, *Lactobacillus bulgaricus* in a culture medium of low-fat milk is added to the culture medium having a solids concentration of about 10 to 20% by weight, for example, in an amount of about 2 to 10% based on the volume of the culture medium. The *lactobacilli* inoculated are cultivated at a suitable cultivating temperature of, say, about 38°to 40° C. Other known and available lactic acid bacteria include, for example, *Lactobacillus acidophilus*, *Streptococcus lactis*, and *Streptococcus thermophilus*.

Especially favorable results are obtained in the process of this invention by utilizing an extract obtained by extracting a cereal germ with hot water in the presence of a starch hydrolase, as a main ingredient of the culture medium. The bacterial population increases exceedingly in this embodiment as compared with the case of using an extract obtained in the absence of the enzyme. We assume that this method of extraction results in a striking increase in the amount of the extract and permits a very easy extracting operation, and that the addition of the starch hydrolase leads to the formation of sugars which are required for lactic acid fermentation using lactic acid bacteria, and also substances which promote the growth of lactic acid bacteria can be extracted to a higher extent.

The food products obtained by the process of this invention comprising the lactic acid bacteria-fermented product of a cereal germ exhibit superior edibility and potability in the form as produced. If desired, they may be mixed with additives such as flavoring substances, sweetenings, conventional coagulated milks, essences such as vanilla, orange or lemon essences, refined sugar, glucose, bee honey, starch syrup, or licorice extract to provide special food products containing lactic acid bacteria-fermented cereal germs. Furthermore, the food products can be dried by customary means under conditions which do not substantially cause thermal changes to the products, for example, by drying at reduced pressure and low temperatures, preferably spray-drying at room temperature or under heat, or by lyophilizing. The dried products are taken as such or used as fortifying nutritive additives to a broad range of food products.

Thus, according to the present invention, there can be provided a fermented product of an extract of the components of a cereal germ or a dried product thereof, which contains useful ingredients in many varieties and amounts which can be used in a wide variety of food products and health-promoting or pharmaceutical compositions. The fermented products and dried products therof can also be used as animal or poultry feeds or feed additives, or as therapeutic or prophylactic agents for animals, or for promoting growth or egg laying.

The following Examples illustrate the process of this invention in greater detail.

EXAMPLE 1 a. 1 Kg of a wheat germ was placed in a 20-liter stainless steel container, and 10 liters of water was added. The mixture was lightly stirred to form a suspension of the germ. The suspension was heated at about 90° C. for 40 minutes and finally boiled for 2 to 3 minutes, then allowed to stand, and filtered to extract hot water-soluble components. The residue was lightly squeezed, and combined with the filtrate obtained to afford 7 liters of a yellowish milky white liquor having a solids concentration of about 3% by weight. The liquor was concentrated at reduced pressure to afford 1.3 liters of a germ extract (A) having a solids concentration of 15%.

b. 1 Kg of a wheat germ was placed in a 20-liter stainless steel container, and 10 liters of water was added. 5 g of $\alpha$-amylase (Kleistase, a product of Yamato Kasei Kabushiki Kaisha, containing protease) was added. The $\alpha$-amylase used had 7500 enzyme units (one enzyme unit is defined as the activity of 1 g of the enzyme which acts on 10 ml of a 1% solution of starch and reduces the iodine color reaction degree of the starch by 1% by reaction at 40° C. for 1 minute). The mixture was thoroughly dispersed with stirring, and gradually heated from room temperature, maintained at about 30° to 40° C. for 40 minutes, further heated and maintained at about 75° C. for 40 minutes, and finally boiled mildly for 2 to 3 minutes. The product was treated in the same way as in (a) above to afford 7.5 liters of a fermentation liquor. The filtrate had a solids concentration of about 4%. The liquor was concentrated at red uced pressure to afford 1.9 liters of a germ extract (B) having a solids concentration of 15%.

c. One liter each of the germ extracts (A) and (B) obtained in (a) and (b) above was placed in a 1..5-liter pre-sterilized three-necked glass flask, and sealed by a cotton stopper. It was sterilized in a customary manner in an autoclave, and allowed to cool to form a culture medium having a pH of about 6.5.

60 ml of a starter resulting from the cultivation of *Lactobacillus bulgaricus* was added to each of the culture media obtained, and cultivated at 38° to 40° C. for 24, 48, 72 and 94 hours, respectively. About 10 cc of each of the fermented products was sampled at the end of each fermentation period, and the bacterial population (the number of active lactobacillus cells) was measured.

For comparison, the same fermentation as above was performed using 1 liter of a culture medium (15% by weight concentration) obtained by adding 1400 ml of water to 210 g of low-fat milk.

The results are shown in Table 1.

Table 1

| Fermentation time (hours) | Extract (A) | | | Extract (B) | | | Comparison | | |
|---|---|---|---|---|---|---|---|---|---|
| | Acidity (%) | pH | Bacterial population | Acidity (%) | pH | Bacterial population | Acidity (%) | pH | Bacterial population |
| 24 | 0.84 | 4.5 | $0.9 \times 10^8$ | 1.20 | 4.2 | $2.8 \times 10^9$ | 1.87 | 3.5 | $2.4 \times 10^9$ |
| 48 | 1.22 | 4.1 | $2.1 \times 10^9$ | 1.84 | 3.5 | $3.0 \times 10^9$ | 2.55 | 3.3 | $2.8 \times 10^9$ |
| 72 | 1.37 | 3.7 | $2.8 \times 10^9$ | 2.12 | 3.5 | $3.4 \times 10^9$ | 2.8 | 3.2 | $2.9 \times 10^9$ |
| 94 | 1.38 | 3.6 | $3.1 \times 10^9$ | 2.30 | 3.4 | $3.6 \times 10^9$ | 3.03 | 3.2 | $2.1 \times 10^9$ |

Note:
The acidity was obtained by titrating the fermentation liquor with 0.1N sodium hydroxide, and calculated as lactic acid (W/V %). The bacterial population (the number of active cells) was the number of the lactic acid bacterial cells per cubic centimeter of the fermentation liquor.

The fermentation liquors obtained by fermenting for 72 hours were each analyzed for Vitamins $B_1$, $B_2$, $B_6$, F and H, nicotinic acid, and calcium. The results are shown in Table 2 below.

Table 2

| Substances | Extract (A) | Extract (B) | Comparison |
|---|---|---|---|
| Vitamin $B_1$ | 0.50 mg% | 0.61 mg% | 0.1 mg% |
| Vitamin $B_2$ | 0.28 mg% | 0.32 mg% | 0.15 mg% |
| Vitamin $B_6$ | 184.0 μg% | 202.0 μg% | 52 μg% |
| Vitamin F | 10.5 mg% | 13.6 mg% | 1.2 mg% |
| Vitamin H (biotin) | 11.2 mg% | 15.4 mg% | 2.2 mg% |
| Nicotinic acid | 61.0 mg% | 78.0 mg% | 41.5 mg% |
| Calcium | 0.2 mg% | 0.28 mg% | 0.01 mg% |

From the examples shown in Tables 1 and 2, it is seen that the lactic acid bacteria-fermented products of cereal germs are far superior to the coagulated milks in accordance with the conventional technical concept.

EXAMPLE 2

10 liters of water was added to 1 kg of a wheat germ (a product of Nissin SeifunKabushiki Kaisha), and 5 g of α-amylase (Kleistase, a product of Yamato Kasei Kabushiki Kaisah) was added. The mixture was sufficiently stirred, and gradually heated at 75° to 80° C. for 40 minutes, followed by gentle boiling for 2 to 3 minutes. The product was filtered by means of a filter cloth, and the residue was lightly squeezed to form 7.5 liters of a filtrate. The filtrate obtained had an extract concentration of 4% and a pH of 6.5. The filtrate was concentrated at reduced pressure to afford about 1.9 liters of a germ extract having an extract concentration of 15%. The extract was then placed in a 5-liter pre-sterilized three-necked flask, and sealed by a cotton stopper. It was sterilized in a customary manner in an autoclave, and cooled rapidly to about 38° C. 200 ml of a starter resulting from the cultivation of *Lactobacillus bulgaricus* was added to the resulting culture medium. The mixture was well shaken, and placed in an incubator at 38° to 40° C.

| Fermentation time (hours) | Acidity (%) | pH |
| --- | --- | --- |
| 24 | 1.0 | 3.7 |
| 48 | 1.3 | 3.6 |
| 72 | 1.4 | 3.5 |

After a lapse of 72 hours, the fermentation liquor was withdrawn, and 3.3 Kg of granular sugar was added, and the mixture was heated to 60° C. Then, a solution of 17 g of a sucrose fatty acid ester (DK-Ester-140, a product of Daiichi Kogyo Seiyaku Kabushiki Kaisha) in a small amount of water was added. The mixture was treated in a homogenizer to form a light yellow gray homogeneous syrup.

EXAMPLE 3

100 liters of water was added to 10 Kg of a wheat germ, and the mixture was heated at about 90° C. for about 30 minutes to extract hot water-soluble components. The mixture was boiled for 2 to 3 minutes, and filtered through a cloth bag. The residue was lightly squeezed to afford about 70 liters of a filtrate which was yellow in color and somewhat opalescent. The extract content of the filtrate was about 3%. The filtrate was concentraed at reduced pressure to afford 16 liters of a germ extract having an extract concentration of 12%. 500 g of lactose was added, and themixture was maintained at about 90° C. for about 30 minutes to sterilize it, and then cooled rapidly to 40° C. One liter of a starter resulting from the cultivation of *Lactobacillus bulgaricus* was added, and the mixture was stirred.

Then, the mixture was maintained at 37° to 40° C. to perform lactic acid fermentation.

| Fermentation time (hours) | Acidity (%) | pH |
| --- | --- | --- |
| 24 | 1.4 | 3.5 |
| 48 | 1.6 | 3.5 |
| 72 | 1.7 | 3.5 |

EXAMPLE 4

10 liters of water was added to 1 Kg of a rice germ (a product of Kanemi Yushi Kabushiki Kaisha) and the mixture was dispersed with stirring. The mixture was heated at about 90° C. for 30 minutes, then boiled lightly for 2 to 3 minutes, and filtered through a gauze to afford 6.3 liters of a filtrate having an extract concentration of 3% and a pH of 6.6. The filtrate was concentrated at reduced pressure to afford about 1.6 liters of a rice germ extract with an extract concentration of 12%. 7 liters of a 12% solution of low-fat powdery milk was added, and the mixture was sterilized at about 90° C. for about 30 minutes. The mixture was cooled to afford a culture medium for lactic acid fermentation. 230 ml of a starter resulting from the cultivation of *Lactobacillus bulgaricus* was added to the culture medium. The culture medium was maintained at 38° to 40° C. to perform the lactic acid fermentation.

| Fermentation time (hours) | Acidity (%) | pH | Bacterial population per cubic centimeter of the fermentation liquor |
| --- | --- | --- | --- |
| 24 | 1.5 | 3.5 | $2.7 \times 10^9$ |
| 48 | 1.76 | 3.5 | $2.8 \times 10^9$ |
| 72 | 1.95 | 3.4 | $2.3 \times 10^9$ |

The fermentation liquor withdrawn after a lapse of 72 hours was treated in ahomogenizer to form a homogeneous turbid liquor, and 1.5 Kg of granular sugar, 1.0 Kg of starch syrup, 18 g of a sucrose fatty acid ester (DK-140, a product of Kaiichi Kogyo Seiyaku Kabushiki Kaisha), and a small amount of an orange flavor were added, and the mixture was again homogenized by a homogenizer.

The resulting syrup was used as an original essence for active lactobacilli-containing drinks.

When this product was maintained in a refrigerator at 10° C. for 4 days, the number of lactobacilli contained was 3.8 million ml.

EXAMPLE 5

10 liters of water was added to 1 Kg of a wheat germ (a product of Nissan Seifun Kabushiki Kaisha), and 5 g of α-amylase (Kleistase, a product of Yamato Kasei Kabushiki Kaisha) was added and dispersed with stirring. The dispersion was gradually heated, and maintained at 75° to 80° C. for 40 minutes. It was again heated, and finally boiled gently for 2 to 3 minutes. The product was filtered to afford 7.4 liters of a filtrate having an extract concentration of 4.8% and a pH of 6.7. The filtrate was concentrated at reduced pressure to afford 2.7 liters of a concentrated liquor having an extract concentration of 12%. The concentrated liquor obtained was sterilized, and 2000 ml of the sterilized liquor was mixed with 800 ml of a 12% solution of low-fat powdery milk, and 100 ml of a starter resulting from the cultivation of *Lactobacillus bulgaricus* was added to the mixture to perform lactic acid fermentation. After a lapse of 48 hours, the fermentation liquor had an acidity of 2.2;1 %, and after a lapse of 72 hours, it had an acidity of 2.6% and a pH of 3.3. It was homogenized by a homogenizer,and 4.0 Kg of granular sugar was mixed. The mixture was homogenized, and sterilized at 70° C. for 15 minutes to afford 5.2 liters of an original essence for lactobacilli-fermented drinks.

EXAMPLE 6

10 liters of water was added to 1 Kg of a wheat germ (a product of Nissin Seifun kabushiki Kaisha), and 2.5 g of commercially available α-amylase (Kleistase, a product of Yamato Kasei Kabushiki Kaisha) was added. The mixture was gradually heated, and finally boiled gently for 2 to 3 minutes. The product was cooled to about 55° C., and 2.5 g of glucoamylase (Sumizyme, a product of Shin Nippon Kagaku Kabushiki Kaisha) was added. The mixture was stirred, maintained at about 55° C. for 5 hours, again heated, and gently boiled for 2 to 3 hours. The mixture was filtered through a gauze to afford 7.9 liters of a filtrate. The filtate was concentrated at reduced pressure to afford 2.5 liters of a concentrated liquor having an extract concentration of 15%. The liquor was sterilized, and cooled by the method already described hereinabove, and 120 ml of a starter resulting from the cultivation of *Lactobacillus bulgaricus* was added to perform lactic acid fermentation. After a lapse of 72 hours, the fermentation liquor had an acidity of 2.3%, and a pH of 3.4 and contained $2.6 \times 10^9$/ml of active lactobacilli. 1.0 Kg of granular sugar and 800 g of starch syrup were dissolved in about 1 liter of water. The solution was boiled, cooled, and admixed with sterilized water to adjust the amount of the mixture to 2.5 liters. The resulting mixture was added to the fermentation product, and sufficiently emulsified to afford an original essence for lactobacilli-containing drinks. This was diluted to about 2.5 times the original volume to form a lactobacillus-fermented drink. When it was stored for 1 month at about 5° C., it contained $1.0 \times 10^9$/ml of active cells.

What we claim is:

1. A process for preparing a lactic acid bacteria-fermented food product from a cereal germ, which comprises inoculating a culture medium containing a water extract of a cereal germ as a main ingredient with lactic acid bacteria, and then cultivating the lactic acid bacteria therein to produce the lactic acid bacteria-fermented product.

2. The process of claim 1 wherein said water extract is obtained by extracting the cereal germ with hot water at a temperature up to the boiling point of the extraction system in the presence of a starch hydrolase.

3. The process of claim 2 wherein the extraction is performed with said starch hydrolase in the further presence of protease.

4. The process of claim 3 wherein said starch hydrolase is α-amylase, malt amylase or gluco-amylase.

5. The process of claim 2 wherein said starch hydrolase is α-amylase, malt amylase diastase, Taka-diatase or gluco-amylase.

6. The process of claim 1 wherein the culture medium has an extract solids content of at least about 2% by weight, based on the weight of the extract.

7. The process of claim 1 wherein the culture medium has an extract solids content of at least about 10% by weight, based on the weight of the extract.

8. The process of claim 2 wherein the amount of the starch hydrolase is about 0.1 to 5% by weight based on the weight of the starting cereal germ.

9. The process of claim 1 wherein said lactic acid bacteria is *Lactobacillus bulgaricus, Lactobacillus acidophilus, Streptococcus lactis* or *Streptococcus thermophilus.*

10. The process of claim 9 wherein said lactic acid bacteria is *Lactobacillus bulgaricus.*

11. The process of claim 2 wherein said lactic acid bacteria is *Lactobacillus bulgaricus, Lactobacillus acidophilus, Striptococcus lactis* or *Striptococcus thermophilus.*

12. The process of claim 11 wherein said lactic acid bacteria is *Lactobacillus bulgaricus.*

* * * * *

UNITED STATES PATENT OFFICE
CERTIFICATE OF CORRECTION

Patent No. 4,056,637      Dated November 1, 1977

Inventor(s) HAGIWARA, ET AL.

It is certified that error appears in the above-identified patent and that said Letters Patent are hereby corrected as shown below:

Claim 11, column 2, line 28, delete "Striptococcus" (both instances) and insert -- Streptococcus --.

Signed and Sealed this

Twenty-first Day of February 1978

[SEAL]

Attest:

RUTH C. MASON
Attesting Officer

LUTRELLE F. PARKER
Acting Commissioner of Patents and Trademarks